United States Patent [19]

Hirsh et al.

[11] Patent Number: 4,976,983

[45] Date of Patent: Dec. 11, 1990

[54] COFFEE PRODUCT WITH REDUCED MALIC ACID CONTENT

[75] Inventors: Kenneth R. Hirsh, Morganville, N.J.; Larry M. Schanbacher, Tarrytown; Alice S. Cha, Mt. Kisco, both of N.Y.

[73] Assignee: Kraft General Foods, Inc., Glenview, Ill.

[21] Appl. No.: 348,627

[22] Filed: May 8, 1989

[51] Int. Cl.$^5$ ............................. A23F 5/00; A23F 5/16
[52] U.S. Cl. ....................................... 426/594; 426/45; 426/271; 426/432; 426/595
[58] Field of Search ................. 426/594, 595, 271, 45, 426/432

[56] References Cited

U.S. PATENT DOCUMENTS

| | | | |
|---|---|---|---|
| 4,160,042 | 7/1979 | Farr et al. | 426/387 |
| 4,204,004 | 5/1980 | Farr et al. | 426/77 |
| 4,278,696 | 7/1981 | Magnolato | 426/422 |
| 4,303,686 | 12/1981 | Stobz et al. | 426/386 |
| 4,317,841 | 3/1982 | Brambilla et al. | 426/239 |
| 4,331,696 | 5/1982 | Bruce, III | 426/595 |

FOREIGN PATENT DOCUMENTS 3239219 4/1984 Fed. Rep. of Germany .
WO87/04598 8/1987 PCT Int'l Appl. .

OTHER PUBLICATIONS

Websters Ninth New Collegeate Dictionary, 1984, p. 718.

*Primary Examiner*—Donald E. Czaja
*Assistant Examiner*—Evan Federman
*Attorney, Agent, or Firm*—Thomas A. Marcoux; Thomas R. Savoie; Linn I. Grim

[57] ABSTRACT

The invention relates to a coffee product which will evoke a decreased gastric acid response upon ingestion. The coffee product has been processed in such a manner that a majority of the malic acid has been removed from the coffee and, importantly, a majority of the chlorogenic acid has been retained.

26 Claims, 1 Drawing Sheet

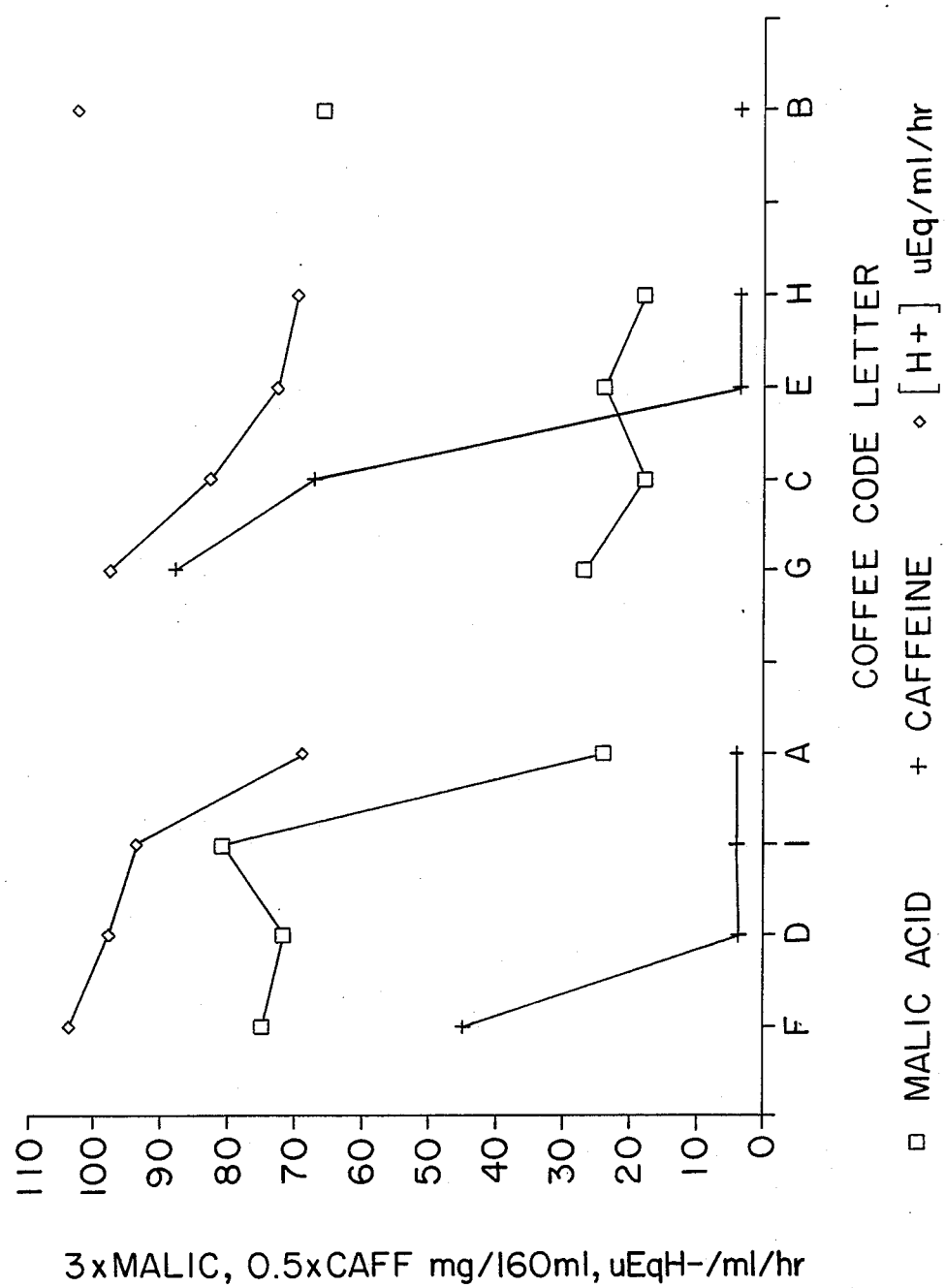

COFFEE PRODUCT WITH REDUCED MALIC ACID CONTENT

TECHNICAL FIELD

The invention relates to coffee processing, specifically to a coffee product which will evoke a decreased gastric acid response after ingestion. The coffee product has been processed to remove a majority of the malic acid.

BACKGROUND ART

There has been speculation since the mid-1940's that coffee contains a gastric acid secretagogue (a stimulant of the production of digestive acid in the stomach) distinct from its caffeine content. That early research has been reconfirmed over the years by numerous investigators who showed that decaffeinated coffee retains a majority of coffee's ability to increase the secretion of acid by the stomach.

Normal food intake leads to gastric acid secretion because of the action of only a few food constituents and the direct effect of stomach distention. Caffeine, coffee, calcium ions, alcohol and the digestion products of protein are the only commonly ingested food components known to increase gastric acid output. The gastric acid secretagogue component of decaffeinated coffee has been the subject of speculation and debate throughout the scientific community.

Early attempts in the food art to produce a "stomach friendly" coffee, that is a coffee which will produce less or no heartburn in susceptible individuals, centered upon the deacidification of coffee such as by chemically neutralising the acids present in coffee by the addition of a food-grade alkaline agent.

Farr and Horman (U.S. Pat. Nos. 4,160,042 and 4,204,004) teach a method of reducing the caffeine and/or chlorogenic acid content of coffee by treatment with particles of carob pods which absorb the caffeine and chlorogenic acid. Magnolato (U.S. Pat. No. 4,278,696) teaches a process for deacidifying a coffee extract by contacting it with chitosan in divided form and recovering the resultant deacidified extract. This patent stresses the importance of the removal of chlorogenic acid since it is the predominant acid found in coffee. However, other acids including malic acid are also reduced by the treatment. Another process, described in U.S. Patent No. 4,317,841 to Brambilla and Horman, teaches the reduction in the acidity of a coffee extract by electrodialysis. The non-cathodic extract is collected, contacted with subdivided chitosan, and after removal of the chitosan, is mixed with at least a part of cathodic extract to provide a deacidified coffee extract.

DE No. 3,239,219 having a disclosure date of Apr. 26, 1984 entitled "Process for the Reduction of the Chlorogenic Acid Content of Raw Coffee" teaches a process involving the contacting of an aqueous extract of green coffee beans with a polymer anion-exchange resin, this resin having been loaded by adsorption with at least one nonacidic coffee extract constituent in order to exchange the acids present in the aqueous extract to produce a reduced chlorogenic acid green coffee. The object of this invention is to produce a coffee product which would reduce irritation of stomach mucosa and not cause stomach acidity.

PCT International Publication Number WO 87/04598 having a publication date of Aug. 13, 1987 entitled "Coffee And Process For Its Production" teaches a coffee product with an increased chlorogenic acid content. This elevated chlorogenic acid level is said to improve the digestibility of coffee by reducing human acid secretion. The physiology studies reported in the patent application were performed on human male and female subjects. However, the p or methodology utilized in the studies including the lack of proper scientific controls render the results questionable at best.

There remains a need in the art to produce a stomach friendly coffee by selectively removing malic acid and without sacrificing the large percentage yield loss and flavor penalty which results from the removal of a majority of chlorogenic acid as taught by prior art references.

DISCLOSURE OF THE INVENTION

The invention relates to a coffee product which will evoke a decreased gastric acid response upon ingestion. The coffee product has been processed in a way such that a majority of the malic acid has been removed from the coffee and, importantly a majority of the chlorogenic acid has been retained during the processing. Also disclosed is a method for producing the unique coffee product which will evoke the reduced gastric acidity response after ingestion.

BRIEF DESCRIPTION OF THE DRAWING

FIG. 1 is a graph which depicts the malic acid content, caffeine content and gastric acid secretion evoked by each of the test coffee samples reported in a cat laboratory experiment, the details of which are to be found in Example 1.

BEST MODE FOR CARRYING OUT THE INVENTION

The coffee product of the present invention has been shown by the present inventors to evoke significantly lower amounts of gastric acid secretions after ingestion. The coffee is processed to yield a product which has a majority of the malic acid removed therefrom and a majority of the chlorogenic acid retained therein. The coffee is processed to selectively remove malic acid while preserving to the maximum possible extent the chlorogenic acid content as well as preserving the other acids. The pH of the malic acid reduced coffee product, because of the selective nature of the processing, should not possess a pH of more than 0.5 pH units difference from the starting coffee prior to removal of malic acid (a process known as demalation).

Preferably, the coffee product has been processed such that greater than 55% of the malic acid has been removed and greater than 55% of the chlorogenic acid has been retained. In a more preferred embodiment greater than 65% of the malic acid has been removed while greater than 75% of the chlorogenic acid has been retained.

A roasted coffee product, either a roasted and ground coffee or roasted whole brans, can be prepared in accordance with the present invention. In such case, the roasted coffee will contain less than 0.085% malic acid on a dry weight basis. A roasted coffee product according to the present invention shall be prepared from a blend of greater than 35% Arabicas.

Analysis of green coffee beans has determined that a typical Robusta coffee contains from 0.12% to 0.36% malic acid on a dry weight basis while a typical Arabica coffee contains a significantly higher amount of from 0.38% to 0.67% malic acid on a dry weight basis Therefore a 100% Robusta soluble coffee (not demalated) may contain a malic acid content of 0.11% to 0.33% malic acid on a dry weight basis, assuming a soluble extraction yield of approximately 50% commercially from the roast and ground coffee. A roasted and ground 100% Robusta coffee (not demalated) may contain a malic acid content of 0.05% to 0.2% malic acid on a dry weight basis depending on the degree of roast Either of these two 100% Robusta coffee products will produce a coffee containing from 2.5 to 9.8 mg. malic acid per cup (for purposes of the present invention, a cup shall measure 160 ml) on an as-consumed basis. However, one skilled in the art will appreciate that a pure Robusta coffee will contain undesirable, earthy, harsh, tarry flavors.

Analysis of varieties of coffee to determine the malic acid content has shown that Arabica coffees possess a significantly higher amount of malic acid than do Robusta coffees The removal of a portion of the malic acid content present in an Robusta bean is believed to provide an incremental benefit to a coffee product to render it more stomach friendly. However, the preferred product of the present invention is a roasted Arabica coffee which will be processed to remove a majority of the malic acid and retain a majority of the chlorogenic acid. This demalated Arabica coffee may be mixed with a Robusta coffee (possessing a naturally lower malic acid) to produce a stomach friendly roasted coffee. The Robusta coffee component may also be demalated but in the preferred product and process the Robusta component is not demalated (due to its lower natural malic acid content). This coffee should contain greater than 35% Arabicas and from 0 to 65% Robustas. The roast and ground coffee which results from either the demalated Arabica/Robusta blend or from the 100% demalated Arabicas will contain a level of 0.085% or less malic acid on a dry weight basis. In the present invention the demalated roast and ground coffee products are formulated from a coffee blend of at least 35% Arabicas, preferably at least 50%. Similarly, since caffeine has previously been identified as a gastric acid secretagogue (a stimulant of the production of digestive acid in the stomach) it is preferred that coffee products of the present invention additionally be decaffeinated to greater than 50% removal of caffeine, preferably greater than 90%.

Alternatively, the demalated Arabica coffee which has been processed to remove a majority of the malic acid and retain a majority of the chlorogenic acid can be combined in an amount greater than 55% with up to 45% of a non-demalated Arabica coffee to produce a roasted coffee blend containing 0.085% or less malic acid. The specific blend of demalated Arabic combined with a non-demalated Arabica will depend upon the degree of demalation and upon the natural malic acid content of the unprocessed Arabica.

The coffee product, whether it be a soluble coffee product, i.e. freeze-dried, spray-dried or extruded powder; a roasted whole bean product, roast and ground coffee or liquid coffee will contain less than 7.8mg of malic acid per cup (160ml) on an as-consumed basis. The term as-consumed basis refers to the product in its reconstituted or brewed from as it is eventually consumed by the coffee consumer, i.e soluble coffee reconstituted with hot water or roast and ground coffee after brewing. The preferred coffee product shall contain from 0 to 7.8mg of malic acid per cup on an as-consumed basis.

The following Examples illustrate certain embodiments of the present invention. The Examples are not meant to limit the invention beyond what is claimed below.

EXAMPLE 1

Nine different coffees were evaluated for their ability to promote gastric acid secretion after ingestion by laboratory cats. These subjects provide a model of human gastric acid secretory response to coffee and coffee compounds.

Preparation of Laboratory Animals

Male, "Minimal Diseased Cats" (Liberty Labs, Liberty Corners, N.J.) weighing 3.2 to 4.5 Kg were prepared with chronic indwelling gastric fistulae. In order to perform the study, the cats were tested on an empty stomach. Water was, however, always available ad libitum. To prepare the animal for testing, the cat is placed into a cloth harness designed to be as comfortable as possible and minimally restrained in a wooden frame for support. Once the cat is settled, the cap of the fistula is removed and the stomach is flushed three times with 30cc of water removing any residue that may be present in the stomach. Note that if the residue contains an excess amount of food particles, the animal is not tested. When the water draining out is clear the animals are ready for testing. The solution collected during the flushing procedure is discarded. The animals were tested only once a week. Three cats were tested per run with 3 runs per week, totaling 9 cats per week. There were 11 samples collected per cat, three of the samples were water and gastric acid controls and eight were recovered test coffee and gastric secretions The animals are exposed to three administrations of 20ml. water at 10 minute intervals through the indwelling fistulae. Gastric contents are recovered prior to each administration and 10 minutes after the final water administration. These three samples are titrated back to pH 7.0, starting pH of the water, which represents the control gastric acid secretion. Following water administration, the cats received eight 20ml doses of identical test coffee solution at 5 minute intervals. Gastric contents are recovered prior to each administration and 5 minutes after the final coffee dose. The 8 gastric content samples resulting from the administration of coffee are back titrated to the starting pH of the coffee. The values for both the control and treated samples are expressed in terms of gastric acid concentration uEq/ml per hour. The results reported represent net acid secretion (coffee minus water control) for the average of eight cats.

Coffee Samples Tested

Nine coffees were prepared for ingestion by the cats for the present study. All nine coffees were roasted and ground coffees that had either undergone demalation, and/or decaffeination or were not subject to any process to alter their malic acid and/or caffeine contents. All coffees were freshly brewed the morning of the test using single cup brewers and selecting an amount of R&G coffee necessary to produce brews containing approximately 1.1% total solids. The nine coffees tested were arbitrarily designated A to I. The composition of each roast and ground coffee is described in Table I. The table describes how each product was processed and its blend composition.

Table 1 is a summary of the coffee samples used, their origin, treatment, descriptions, roast color, percent malic acid and caffeine content on a dry basis in the bean and on a total basis in mg per 160cc brewed coffee volume as tested.

Note that coffees F, D, I and A were Arabica coffees. Coffee F was the roasted Arabica coffee control. Coffee D was derived from the same green beans as F except they were decaffeinated using the supercritical $CO_2$ method. Coffee A was derived from the same green beans as D but were further processed by an ion exchange method similar to the process set forth in Example 2 to remove approximately 75% of the malic acid present. Coffee I was actually prepared each test day it was to be used just prior to animal testing by adding L-malic acid to the extract from coffee A immediately after brewing twice as much of coffee A was used in the study as of any other sample because an equal quantity of it was used to prepare sample I. The only difference between coffee A and coffee I is the addition of about 20 mg of L-malic acid to coffee A to make the brew called Coffee I.

Coffees C, E and H were Robusta coffees. Coffee C was the roasted Robusta coffee control. Coffee E was derived from the same green beans as coffee C except that they were decaffeinated using an activated carbon process. Coffee H was derived from the same green beans as E except they were further processed by ion exchange to further reduce their malic acid content.

Coffee G was also a Robusta coffee but was higher in caffeine and malic acid content than coffee C by about 50%. Coffee B was a commercially available roasted and ground decaffeinated coffee. The chlorogenic acid content of samples A and D were measured and it was determined that approximately 43% of the chlorogenic acid was removed during the demalation process.

lesser increase in gastric acid secretion than does coffee with higher malic acid content, all other factors being equal. Whether the malic acid is low because it was removed via processing steps (such as in coffee A or because the coffee is naturally low in malic acid content (such as coffees C & E) the response to coffee (increased gastric acid production) is less when malic acid is low. High caffeine content raises the acid production response although not as much in these cats as in humans.

Further, this study shows, in the cat at least, that malic acid restoration, as in coffee I (same coffee as A but with malic acid added back after brewing) leads to restoration of gastric acid secretion to levels similar to that evoked by high malic acid containing coffee such as coffee D (full malic acid but decaffeinated).

Coffee Comparisons

Coffee A, a demalated and decaffeinated Arabica coffee (derived from coffee F by an ion exchange processing technique) trended toward evoking significantly less acid secretion than coffee F, its full malic acid and caffeine containing parent coffee. Coffee A also trended toward being significantly less stimulating to gastric acid secretion than coffee D, its decaffeinated, but full malic acid containing progenitor. Coffee A also trended to significance in its difference from coffee I which was in actuality coffee A itself spiked with enough L-malic acid, after brewing, to raise its malic acid content to the level found in coffee D. It appears that malic acid is fairly specifically the active component removed from the starting coffee through the entire demalation process.

Whereas coffees F, D, I and A were all Arabicas, coffees G, C, E and H were all Robustas. It was found that coffee A trended toward being significantly less stimulating to gastric acid secretion than coffee G, even

TABLE 1

| Coffee Sample | Description | Roast Color | Malic Acid % (dry basis) | Malic Acid mg./160 ml | Caffeine % (dry basis) | Caffeine mg./160 |
| --- | --- | --- | --- | --- | --- | --- |
| A | Demalated and Decaffeinated 100% Arabica | 48 | 0.085 | 7.80 | 0.065 | 7.80 |
| B | Decaffeinated 45% Robusta 55% Arabica Blend | — | 0.275 | 21.8 | 0.050 | 7.00 |
| C | 100% Robustas | 84 | 0.108 | 6.38 | 2.42 | 140.44 |
| D | Decaffeinated 100% Arabica | 52 | 0.307 | 24.45 | 0.065 | 7.0 |
| E | Decaffeinated 100% Robustas | 84 | 0.090 | 7.84 | 0.043 | 7.20 |
| F | 100% Arabica | 52 | 0.308 | 24.02 | 1.46 | 92.84 |
| G | 100% Ivory Coast Robustas | 78 | 0.154 | 9.79 | 2.32 | 187.63 |
| H | Decaffeinated and Demalated Robustas | 78 | 0.071 | 6.0 | 0.043 | 6.60 |
| I | Decaffeinated and Demalated 100% Arabica Malic Acid Added Back After Demalation | 48 | — | 26.60 | 0.065 | 7.8 |

Primary Finding

The results of the Experiment are reported in FIG. 1. The graph shows the malic acid content, caffeine content and gastric acid secretion evoked by each of the test coffees grouped by coffee variety (the blended coffee B is shown separately) In order to display the three variables on one graph, scaling factors were applied to the Y axis as follows:
1. malic acid values are three times higher than actual,
2. caffeine values are half the actual value, and
3 gastric acid secretion values are actual values (no scaling factor used).

The most important finding of the present study, in cats, is that coffee with low malic acid content evokes a through coffee G was moderately low in malic acid content. It is not certain whether the higher malic acid content of coffee G compared to coffee A (9.79 vs 7.89 mg/160cc) or coffee G's very high caffeine content (187.63 mg/160cc in G vs 7.8 mg/160cc in A) was responsible for the difference between these 2 coffees.

Conclusions

The study concluded the following:
1. Low malic acid content of coffee is an excellent indicator of low gastric acid secretion liability for coffees of similar caffeine content.
2. Very high caffeine levels in coffee may lead to increased gastric acid secretion despite the presence of a reduced or naturally low malic acid content.
3. No difference in effect upon gastric acid secretion was found between coffees that were naturally low in malic acid content, such as the Robusta coffees and those that were naturally high in malic acid content, such as the Arabicas, which were processed to reduce the level of malic acid to that found naturally in the Robusta coffees.
4. Restoration to starting level of only the single chemical entity, L-malic acid, to a coffee that had been processed to reduce the content of that compound restored the majority of the gastric acid secretion liability reduced upon demalation.

EXAMPLE 2

This example sets forth four different processes for removing a majority of malic acid from coffee while retaining a majority of chlorogenic acid. The four different processes are designated (a) to (d)

(a) Ion Exchange/Green Extract Process

Green coffee is demalated via a single pass aqueous green coffee extract process in the following manner using ion exchange resins to exchange malic acid in the green coffee extract for acetic acid.

A 6-inch diameter by 8-foot tall jacketed glass column was filled with DOW XUS 40373 resin in the hydroxide form to a height of 4 feet (20,300 cc.). The resin was backwashed and converted to the acetate form using acetic acid by means commonly employed with resins.

A total of 13.6 gallons of green coffee extract having a total solids concentration of 20% and a malic acid content of 0.23% (as is) was passed over the ion exchange resin at a temperature of 180° F, demalated and collected in three equal aliquots of 4.5 gallons having a malic acid concentration (on an as is basis) of 0.048% 0.021% and 0.046% respectively to achieve an overall demalation of the extract of ca. 83.3%. Due to the dilution effects of water absorbed within and around the resin beads, the initial total solids concentration of the extract feed was diluted to 14.4%, 15.5% and 16.7% respectively in the three aliquots Chlorogenic and acetic acid contents of the feed extract were measured at 4.94% (as is) and 0.14% (as is) respectively. The demalated extract aliquots contained (on an as is basis) 0.46%, 0.89% and 1.59% chlorogenic acid respectively. The acetic acid content of the demalated extract increased to approximately 1.8% (as is).

The second 4.5 gallon aliquot of demalated extract was used to extract malic acid from 1 kilogram of decaffeinated Colombian coffee in a 3-inch diameter by 4-foot tall jacketed glass column at 180° F, 200 mls/min flowrate in 1.5 hours. After passing over the beans, approximately 4.2 gallons of extract was collected containing 16.7% total solids, 0.04% (as is) malic acid, 1.1% (as is) chlorogenic acid and 1.96% (as is) acetic acid.

After demalation, 1 liter of distilled water was used to wash the extract from the beans The beans were then air dried at 160° F. for 1.25 hours to a final weight of 985 grams. Analysis of the green coffee before and after demalation was as follows:

| | % Moisture | % Malic Acid, d.b. | % Chlorogenic Acid, d.b. | % Acetic Acid, d.b. | % Caffeine d.b. |
|---|---|---|---|---|---|
| Starting Colombians | 10.99 | 0.390 | 7.07 | 0.170 | 0.056 |
| Demalated Colombians | 12.94 | 0.103 | 5.08 | 1.86 | 0.065 |

As shown, a 73.6% dry basis demalation of the green coffee was achieved and 71.9% of the chlorogenic acid was retained within the green coffee.

(b) Filter Containing Roast and Ground Coffee and Resin

A set up of R & G coffee/ Filter/ Resin/ Filter is described in this process. The Roast and Ground Coffee is placed on the first coffee filter; the resin is spread on the second coffee filter in such a way that a layer, approximately 0.5" thick is formed. The resin and filter combination are placed underneath the coffee and filter, and the complete set up is placed in the basket of a home coffee maker. The resin is used at a ratio of 1.0 grams of coffee solids in the brew per gram of dry resin necessary to effectively remove malic acid from coffee brew.

The coffee brew (brown coffee extract) is produced in the conventional manner by brewing 58.2 grams of roasted ground coffee with 1800 milliliters of boiling water in a home brewer. The coffee brew, via the mechanics of the filter set up, then comes in contact with 8.7 grams of dry resin (15 grams as is; 42% moisture) of the strong anion exchange resin, XUS 40163 in the acetate form, which will exchange malic acid for the acetate ion, thus producing ready-to-drink malic acid reduced brewed coffee.

A coffee brew prepared according to the recipe above and using the XUS 40163 resin in the acetate form according to the described set up, was sampled and analyzed for malic acid, total coffee solids pH and titratable acidity. A control brew, which was prepared under the same conditions (58.2 grams of R&G coffee with 1800 mls boiling water) but without the resin was used for comparison. The results show that 77.78% of the available malic acid in the brew was removed across the resin bed with 11.6% solids loss The pH of the demalated coffee brew increased about 2% (from 4.86 to 4.97) in comparison to the control brew. Organoleptic evaluation showed the malic reduced brew to be slightly less acidic and very close to the control in aromatic coffee attributes. Overall the freshly brewed malic reduced coffee was of comparable quality to the freshly brewed control.

In addition to the XUS 40163 resin in the acetate form, the same XUS 40163 resin but in the phosphate citrate, chloride and hydroxide forms can be used to produce a malic reduced coffee brew via the R&G/ Filter/ Resin/ Filter set up in a home coffee brewer.

(c) Malolactate Fermentation

Nine hundred pounds of green coffee extract containing 0.144% malic acid (as is), 20.0% total solids, 0.05% insolubles, and a pH of 4.91 is clarified via a 0.2 um crossflow ceramic microfiltration unit. The unit is operated at 100° F. and at an average pressure of 80 psi. Seven hundred and thirty pounds of clarified (insoluble free) green extract is collected as permeate. The permeate contains 0.144% malic acid and 17.9% total solids. One hundred and seventy pounds of insoluble rich extract (retentate) is nor used further in this example. The clarified extract is when fed to a series of cartridge filters to sterilize the extract The filter system consists of two filter cartridges in series. The first filter is a 0.3 um pre-filter made of a cellulose ester. The second filter is a 0.22 um dead-end final filter made of a hydrophilic polyvinylidene difluoride. Extract is fed to the filters at 80° F. at a rate of 55 lb/minute. Extract leaving the final filter is considered sterile and free of microorganisms; this is determined via a culture plate which was incubated at 37° C. for 72 hours. Sterile extract leaving the final filter contains 17.9% total solids (TS) and passes through a chiller to maintain 80° F., then is directly fed to a 750 L fermentor. Prior to use, the pre-filter is hot water sanitized, the final filter, fermentor and piping are steam sterilized.

Initially the 750 L fermentor contained 235 lbs of green extract containing ca. 2.3 E+06 CFU/ml (colony forming units/ml) of L. oenos, 24.4% TS, and 0.076% (as is) malic acid. The 730 lbs. of malic rich green extract from the filter sterilization unit is added to the fermentor. The malic acid rich green extract in the 750 L fermentor is then inoculated with 120 lbs. of green extract with an L. oenos cell count of 6.0 E+06 CFU/ml. and a malic acid level of 0.013% (as is). At this point, time zero, the 750 L fermentor contains 0.113% malic acid (as is) and 6.5 E+06 CFU/ml L. The 750 L fermentor is maintained at 87° F, 3 psi, agitated at 100 rpm and is aerated with 25 L/min of sterile air. After hours, the malic acid level of the extract in the fermentor was reduced to 0%, the cell count had increased to 8.8 E+08 CFU/ml, and the PH had decreased to 4.62 from 4.85.

In a sterile fashion, 1,085 lbs. of malic lean, cell rich green extract was passed through a 0.2 um ceramic crossflow microfiltration unit to separate the L. oenos cells from the malic lean green extract. The unit was operated at 80° F. and an average pressure of 60 psi Eight hundred and sixty-five pounds of malic and cell lean green extract was collected as permeate. The permeate contained 0% malic acid, 18.4% TS, and 5.1 E+03 CFU/ml L. oenos. This extract was then stored at 160° F., waiting to be passed through a bed of fresh malic rich green beans. One hundred and forty-five pounds of the cell rich green extract (retentate from the microfiltration unit) is returned to the 750 L fermentor to await the addition of malic rich green extract.

The retentate returned to the 750 L fermentor contains 6.8 E+09 CFU/ml L oenos and 23.6% TS. This extract is maintained at 87° F.

One hundred and thirty-four pounds of decaffeinated Central beans (as is @11.5% $H_2O$) with an initial malic acid content of 0.486%, dry basis (db) were demalated with the above mentioned malic lean green extract containing 0% malic acid and 18.4% TS. Malic acid rich beans at 40% $H_2O$ are fed semi-continuously to the top of the green bean extractor. The green bean extractor is an atmospheric pulse column which pulses malic rich beans in the top and discharges malic lean beans from the bottom every 30 minutes. Malic lean green extract at 177° F. is fed countercurrently in a one pass fashion across the bean bed to extract the malic acid at 6.3/1 extract to bean ratio per pulse. The beans have a residence time in the extractor of 6.5 hrs. The beans leaving the extractor are at 54% $H_2O$ and contain 0.006% malic acid (db). The green extract leaving the top of the extractor is rich in malic acid at 0.09% (as is) and at a 19.8% TS level.

The malic lean beans are then dried from 54 to 11% $H_2O$ in a fluidized bed air dryer at 180° F.

The green bean extractor pulse column is 4 inches I.D., by 33 feet in height. Green extract is passed across the bean bed at a superficial velocity of 0.2 ft/min..

The malic rich green extract leaving the extractor is collected (880 lbs.) and held at 160° F and awaits clarification, sterilization and addition to the 750 L fermentor.

The chlorogenic acid content of the green demalated coffee was not reduced.

(d) Improved Malolactate Fermentation

In a separate experiment, eight hundred and eighty-two pounds of green coffee extract containing 0.09% malic acid as is, 1%.5% TS, 0.08% insolubles, and a pH of 4.67 (malic rich extract from end of example 2(c)) is clarified via a 0.2 um crossflow ceramic microfiltration unit. The unit is operated at 169° F. and at an average pressure of 80 psi. 743 lbs. of clarified (insoluble free) green extract is collected as permeate. The permeate contains 0.09% malic acid as is and 16.4% total solids. One hundred and thirty-nine pounds of insoluble rich extract (retentate) is not used further in this example. The clarified extract is then fed to a series of cartridge filters to sterilize the extract.

The filter system consists of two filter cartridges in series. The first filter is a 0.3 um pre-filter made of a cellulose ester. The second filter is a 0.22 um dead-end final filter made of a hydrophilic polyvinylidene difluoride. Extract is fed to the filters at 110° F. at a rate of 22 lb/minute. Extract leaving the final filter is considered sterile and free of microorganisms; this is determined via a culture plate which was incubated at 37° C. for 72 hours. Sterile extract leaving the final filter contains 16.2% TS and passes through a chiller to maintain 80° F., then is directly fed to a 750 L fermentor. Prior to use, the pre-filter is hot water sanitized, the final filter, fermentor and piping is steam sterilized.

Initially, the 750 L fermentor contained 145 lbs of green extract containing ca. 6.2 E+09 CFU/ml (colony forming units/ml) of L. oenos, 23.0% TS, and 0.0% malic acid. The 743 lbs. of malic rich green extract from the filter sterilization unit is added to the fermentor At this point, time zero, the 750 L fermentor contains 0.07% malic acid (as is, 18.0% TS, a pH of 4.62, and 1.2 E+09 CFU/ml L. The 750 % fermentor is maintained at 87° F., 3 psi, agitated at 100% rpm and is aerated with 25 L/min of sterile air. After 6 hours, the malic acid level of the extract in the fermentor had been reduced to 0%. the cell count had increased to 1.5 E+09 CFU/ml and the pH had decreased to 4.40%.

In a sterile fashion, 888 lbs. of malic lean, cell rich green extract was passed through a 0.2 um ceramic crossflow microfiltration unit to separate the L. oenos cells from the malic lean green extract. The unit was operated at 82° F. and an average pressure of 80 psi. 749 lbs of malic and cell lean green extract was collected as permeate. The permeate contained 0% malic acid, 15.4% TS, and 7.7 E+03 CFU/ml L. oenos. This extract was then stored at 160° F., waiting to be passed through a bed of fresh malic rich green beans. 139 lbs of the cell rich green extract (retentate from the microfiltration unit) contains 6.2 E+09 CFU/ml L oenos, 23.0% TS. This extract is not used further in this example.

One hundred and ten pounds of decaffeinated Central beans (as is @11.5% $H_2O$) with an initial malic acid content of 0.486%, db were demalated with the above mentioned malic lean green extract containing 0% malic acid and 15.4% TS. Malic acid rich beans at 40% $H_2O$ are fed semi-continuously to the top of the green bean extractor. The green bean extractor is an atmospheric pulse column which pulses malic rich beans in the top and discharges malic lean beans from the bottom every 30 minutes. Malic lean green extract at 178° F. is fed countercurrently in a one pass fashion across the bean bed to extract the malic acid at a 6.8/1 extract to bean ratio per pulse. The beans have a residence time in the extractor of 6.5 hrs. The beans leaving the extractor are at 56% $H_2O$ and contain 0.00% malic acid (db). The green extract leaving the top of the extractor is rich in malic acid at 0.091% as is and at a 19.0% TS level.

The malic lean beans are then dried from 56 to 11% $H_2O$ in a fluidized bed air dryer at 180° F.

The green bean extractor pulse column is 4 inches I.D., by 33 feet in height. Green extract is passed across the bean bed at a superficial velocity of 0.23 ft/min.

The malic rich green extract leaving the extractor (880 lbs.) is collected.

The chlorogenic acid content of the green demalated coffee was not reduced as compared to its initial content.

EXAMPLE 3

The green demalated coffee produced in example 2 (c) is roasted to a 50° L. roast color. Upon roasting, the demalated product contains 0.024% malic acid and 0.039% caffeine on a dry weight basis compared to the control of 0.32% malic acid and 0.0285% caffeine. The product was judged to be typical of a roast and ground Centrals product and slightly more sour than its non-demalated, decaffeinated control.

EXAMPLE 4

The green demalated coffee produced in example 2(c) is roasted to a 50° L. roast color. Upon roasting, the demalated product contains 0.024% malic acid and 0.039% caffeine on a dry weight basis Green decaffeinated Robusta coffee from Ivory Coast containing 0.253% malic acid and 0.06% caffeine of a dry weight basis is roasted to a 64° L. roast color. Upon roasting, the decaffeinated Ivory Coast Robusta contains 0.128% malic acid on a dry weight basis. The roasted demalated, decaffeinated Centrals are blended with the roasted Ivory Coast product at a ratio of at least 42% Centrals to produce a demalated product blend containing 0.085% malic acid or less on a dry weight basis.

EXAMPLE 5

The roasted decaffeinated demalated Centrals in example 3 containing 0.024% malic acid and 0.039% caffeine on a dry weight basis are blended with the roasted non-demalated, decaffeinated Centrals control of the same example in a ratio of at least 80% demalated, 20% non-demalated to produce a demalated Roast and Ground coffee product containing 0.085% malic acid or less on a dry weight basis.

We claim:

1. A roasted Arabica coffee product which will evoke a decreased gastric acid response upon ingestion, said coffee product having a majority of the malic acid removed therefrom and a majority of the chlorogenic acid retained therein.

2. The product of claim 1 wherein said coffee has greater than 55% of the malic acid removed and greater than 55% of the chlorogenic acid retained therein.

3. The product of claim 2 wherein said coffee has greater than 65% of the malic acid removed and greater than 75% of the chlorogenic acid retained therein.

4. The product of claim 1 wherein the roasted Arabica coffee contains a level of 0.085% or less malic acid on a dry weight basis.

5. The product of claim 1 wherein the Arabica coffee is decaffeinated.

6. A roasted coffee product containing at least 35% of the demalated roasted Arabica coffee of claim 1 and from 0 to 65% of a roasted Robusta coffee.

7. The coffee product of claim 6 wherein the product contains at least 50% of the demalated roasted Arabica coffee.

8. The product of claim 6 wherein the roasted coffee product is decaffeinated.

9. A roasted coffee product containing a level of 0.085% or less malic acid on a dry weight basis which comprises a combination of greater than 55% of the demalated roasted Arabica coffee of claim 1 and up to 45% of a non-demalated Arabica coffee.

10. The product of claim 9 wherein the roasted coffee product is decaffeinated.

11. A process for producing a roasted coffee product which will evoke a decreased gastric acid response upon ingestion comprising:
    processing an Arabica coffee by removing from said Arabica coffee a majority of the malic acid while retaining a majority of the chlorogenic acid, and
    blending at least 35% of the malic acid reduced Arabica coffee with 0 to 65% Robusta coffee to produce a roasted coffee containing a malic acid content of 0.085% or less on a dry weight basis.

12. The process of claim 11 wherein the Arabica coffee has been processed to remove greater than 55% of the malic acid and greater than 55% of the chlorogenic acid is retained.

13. The process of claim 11 wherein the Arabica coffee has been processed to remove greater than 65% of the malic acid and greater than 75% of the chlorogenic acid is retained.

14. The process of claim 11 wherein the roasted coffee product is decaffeinated.

15. The product produced by the process of claim 11.

16. The product produced by the process of claim 14.

17. A process for producing a roasted coffee product which will evoke a decreased gastric acid response upon ingestion comprising:
    processing an Arabica coffee by removing from said Arabica coffee a majority of the malic acid while retaining a majority of the chlorogenic acid, and
    blending at least 55% of the malic acid reduced Arabica coffee with up to 45% of a non-demalated Arabica coffee to produce a roasted coffee containing a malic acid content of 0.085% or less on a dry weight basis.

18. The process of claim 17 wherein the Arabica coffee has been processed to remove greater than 55% of the malic acid and greater than 55% of the chlorogenic acid is retained.

19. The process of claim 17 wherein the Arabica coffee has been processed to remove greater than 65% of the malic acid and greater than 75% of the chlorogenic acid is retained.

20. The process of claim 17 wherein the roasted coffee product is decaffeinated.
21. The product produced by the process of claim 17.
22. The product produced by the process of claim 20.
23. A process for producing a coffee product which will evoke a decreased gastric acid response upon ingestion which comprises removing from coffee a majority of the malic acid while retaining a majority of the chlorogenic acid.
24. The process of claim 23 wherein greater than 55% of the malic acid is removed while greater than 55% of the chlorogenic acid is retained.
25. The process of claim 24 wherein greater than 65% of the malic acid is removed while greater than 75% of the chlorogenic acid is retained.
26. The process of claim 23 wherein the coffee product is decaffeinated.

* * * * *